May 5, 1931. J. GOLNICK 1,804,007
CLAMP
Filed Dec. 10, 1930

INVENTOR.
John Golnick
BY Thos. S. Donnelly
ATTORNEY.

Patented May 5, 1931

1,804,007

UNITED STATES PATENT OFFICE

JOHN GOLNICK, OF DETROIT, MICHIGAN

CLAMP

Application filed December 10, 1930. Serial No. 501,353.

My invention relates to a new and useful improvement in a clamp and has for its object the provision of a clamp having an adjustable engaging member and provided with means for releasing said engaging member for rapid adjustment to the various positions desired.

Another object of the invention is the provision of a clamp having a screw operated clamping member and provided with means for releasing said clamping member for free movement in its mountings.

Another object of the invention is the provision in a clamp, having a screw operated clamping member adapted for free movement in its mountings, of a nut movable into operative and inoperative position so arranged that upon pressure being exerted on the screw operated clamping member, the engagement of the nut with the screw becomes increased.

Other objects will appear hereinafter.

The invention consists in the combination and arrangement of parts hereinafter described and claimed.

The invention will be best understood by a reference to the accompanying drawings which form a part of this specification, and in which, Fig. 1 is a side elevational view of the invention.

Figure 1:
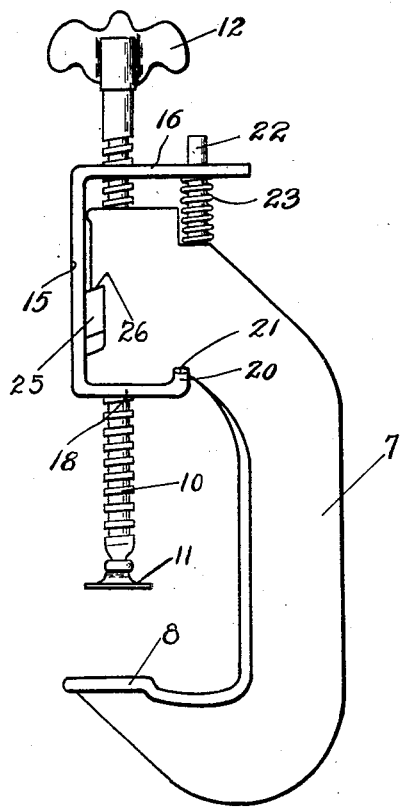

The invention relates to a clamp having a main body portion 7 and a stationary jaw 8 co-operating with which is a moveable clamping member which embodies a screw 10, projected through a bore 9 formed in one end of the body 7. The screw 10 is provided at its engaging end with a swivel shoe 11 and at its opposite end with a wing nut or crank 12 for effecting a turning of the same. The body 7 is provided with an opening 13 which communicates with the bore 9, said opening having a beveled edge 14 at one side which is adapted to engage the beveled surface 26 of a half nut 25 which is mounted upon a supporting frame 15, positioned on the main body 7 at one end thereof. This member 15 is provided with an angularly turned portion 16 having an opening 17 formed therein, through which the screw 10 projects, said opening 17 being of larger diameter than the diameter of the screw 10 to provide sufficient clearance of the screw in making the adjustments. The member 15 is provided at its opposite side with an angularly turned portion 18 having an elongated slot 19 formed therein, the end of the member 18 being angularly turned to form the flange 20.

Figure 3:
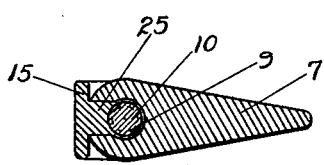
Fig. 3 is a sectional view taken on substantially line 3—3 of Fig. 2.
Figure 4:
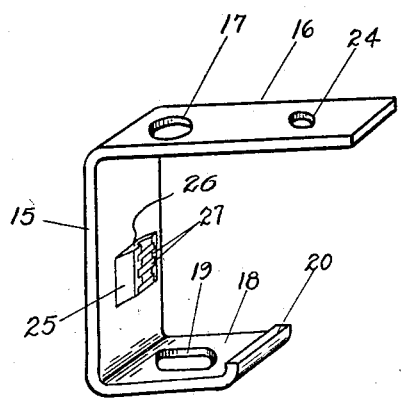
Fig. 4 is a perspective view of the nut carrying means used in the invention.

When assembled on the body 7, the screw 10 projects through the opening 17 and through the slot 19, the flange 20 engaging in a groove 21 formed in the body 7. Mounted in the body 7, adjacent one end, is a stud 22 which is adapted to project through the opening 24 formed in the portion 16, a spiral spring 23 being positioned upon the stud 22 in embracing relation and adapted to engage, at one end, the body 7, and at the other end, the portion 16 of the supporting member. The half nut 25 which is mounted upon the member 15 may be attached thereto in any suitable manner, although welding is a preferable means of attaching. This half nut 25 is formed with its outer surface arcuate as shown in Fig. 3, and provided with threads 27 which are adapted to mesh with the threads on the screw 10.

When the device is assembled as shown in Fig. 1, a turning of the screw 10 moves the engaging shoe 11 relatively to the jaw 8, the half nut 25 serving to co-operate with the threads on the screw 10. When the shoe 11 engages the material to be clamped, and pressure is exerted upon the half nuts 25, it is brought into engagement with the beveled surface 14, thereby serving to move the half nut 25 into closer engagement with the screw 10 as the pressure increases.

Figure 2:
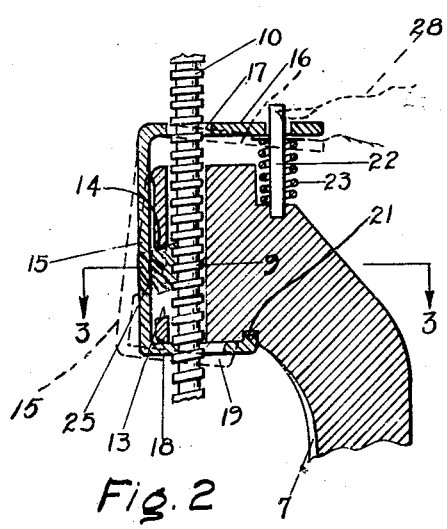
Fig. 2 is a fragmentary, sectional view of the invention.

When it is desired to adjust the screw relatively to a work piece before engagement therewith, a downward pressure on the portion 16 relatively to the body 7 will cause the flange 20 to disengage from the groove 21. A further movement of the portion 16 downwardly relatively to the body 1 will cause a disengagement of the half nut 25 with the screw 10, thus releasing it for free movement in the bore 9. In order to effect this movement, a pressure with the finger 28 as shown in Fig. 2, will move the parts to the position shown in dotted lines in Fig. 2. When moved to the position shown in dotted lines in Fig. 2, it is apparent that free movement of the screw 10 in its mountings may be effected.

With a clamp of this nature, it is evident that a considerable saving of time may be had in adjusting the clamp to the work piece with which it is to be engaged, and that a locking of the nut in engagement with the screw when under pressure is a positive one and one that is highly efficient. The structure of the device is simple, the various parts being made out of suitable material as desired.

While I have illustrated and described the preferred form of structure of my invention, I do not wish to limit myself to the precise form of structure shown, but desire to avail myself of such variations and modifications as may come within the scope of the appended claims.

Having thus described my invention, what I claim as new and desire to secure by Letters Patent is:

1. A clamp, comprising: a main body portion; a stationary jaw mounted thereon, said main body portion having a bore formed therein at the end opposite said jaw and provided with an opening communicating with said bore, said opening having a beveled edge at one side; a screw threaded into said bore; a substantially U-shaped frame having its bight extended parallel to the longitudinal axis of said screw and each of its legs being provided with an opening for accommodating said screw, one of said legs being angularly turned at its end and adapted for engagement in a groove formed in said main body portion; a half nut mounted on the bight of said U-shaped member adapted for engagement, when in operative position, with said screw, and for disengagement therefrom upon the disengagement of said angularly turned portion of said leg from said groove, said half nut having a beveled surface adapted for engagement with the beveled edge of said opening; and resilient means for normally retaining said half nut in engagement with said screw.

2. A clamp of the class described, comprising: a main body portion, a stationary jaw mounted on said main body portion, adjacent one end thereof, said main body portion having a core formed therein at its opposite end, and provided with an opening communicating with said bore; a screw adapted for projection through said bore; a swivelly mounted foot on said screw, adapted for co-operating with said jaw for clamping objects therebetween; a substantially U-shaped frame having one of its legs longer than the other, the extreme end of the shorter of said legs being angularly turned to lie substantially parallel with the bight, the bight of said U-shaped member being extended in parallel relation to the longitudinal axis of said screw; an engagement member mounted on the bight of said U-shaped member having threads formed on its outer face, said engagement member being adapted for movement into said opening for effecting the meshing of its threads with the threads of said screw, said engagement member having a beveled face adapted for engaging the beveled edge of said opening when in operative position, said angular turned portion of said leg being adapted for engagement in a groove formed in said main body portion upon movement of said engagement member into operative position; a stud mounted on said main body portion adjacent said bore, and projected through an opening formed in the longer of said legs; and a spring positioned on said stud and adapted for engaging, at one end, the longer of said legs, and at the opposite end, said main body portion for normally retaining said engagement member in operative position relatively to said screw.

In testimony whereof I have signed the foregoing specification.

JOHN GOLNICK.